United States Patent [19]

Johnson

[11] Patent Number: 4,904,424

[45] Date of Patent: Feb. 27, 1990

[54] CERAMIC ALLOYS FROM COLLOIDAL METAL ALLOY SUSPENSIONS

[75] Inventor: Robert E. Johnson, Hoboken, N.J.

[73] Assignee: Hoechst Celanese Corporation, Somerville, N.J.

[21] Appl. No.: 55,221

[22] Filed: May 29, 1987

[51] Int. Cl.[4] ............... D01D 10/02; D01F 9/22; C04B 35/56

[52] U.S. Cl. .............. 264/29.2; 264/29.6; 264/63; 264/65; 264/66; 264/60; 264/82; 264/182; 264/DIG. 19; 264/211.11; 264/211.15; 264/211.17; 264/206; 501/88; 501/89; 501/90; 501/91; 501/153; 501/154; 75/252; 75/254; 420/548

[58] Field of Search .......... 501/88, 89, 90, 91, 501/153, 154; 164/473; 264/DIG. 19, 29.2, 29.6, 63, 65, 66, 60, 82, 83, 182, 206, 211.11, 211.15, 211.17; 423/345, 439, 440; 75/252, 254; 420/548

[56] References Cited

U.S. PATENT DOCUMENTS

| | | | |
|---|---|---|---|
| 3,399,979 | 9/1968 | Hamling | 23/347 |
| 3,403,008 | 9/1968 | Hamling | 23/344 |
| 3,808,015 | 4/1974 | Seufert | 106/65 |
| 3,846,527 | 11/1974 | Winter et al. | 264/63 |
| 4,010,233 | 3/1977 | Winter et al. | 264/63 |
| 4,073,999 | 2/1978 | Bryan et al. | 428/312.8 |
| 4,126,652 | 11/1978 | Oohara et al. | 501/93 |
| 4,162,301 | 7/1979 | Hamling | 264/DIG. 19 |
| 4,248,814 | 2/1981 | Yajima et al. | 264/63 |
| 4,559,191 | 12/1985 | Arons | 264/60 |
| 4,569,922 | 2/1986 | Suzuki | 501/89 |
| 4,678,760 | 7/1987 | Ray | 501/88 |
| 4,687,657 | 8/1987 | Clark et al. | 501/89 |

OTHER PUBLICATIONS

"Fabrication and Characterization of SiC–AlN Alloys", William Rafaniello et al, *Journal of Materials Science*, 16 (1981), 3479–3488.

*Primary Examiner*—William R. Dixon, Jr.
*Assistant Examiner*—Andrew Griffis
*Attorney, Agent, or Firm*—Depaoli & O'Brien

[57] ABSTRACT

Ceramic alloys or solid solutions are formed by dispersing a powdery metal alloy or intimate mixture of two alloying metals in a precarbonaceous polymer such as polyacrylonitrile, forming the mixture into a molded article such as fibers, and heating the molded articles at a temperature and in a pyrolyzation atmosphere sufficient to carbonize the polymer and cause reaction of the metals with carbon and/or the pyrolyzation gas.

22 Claims, No Drawings

CERAMIC ALLOYS FROM COLLOIDAL METAL ALLOY SUSPENSIONS

FIELD OF THE INVENTION

The present invention relates to a process for preparing molded products containing ceramic alloys or solid solutions.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

To overcome the problems associated with forming ceramic materials into molded products, various alternatives have been suggested. For example, it is believed that ceramics made from organosilicon polymers have the potential to overcome the problems associated with molding and sintering inorganic ceramics. Thus, polymers based on silicon, carbon and/or nitrogen and oxygen have been developed. See for example, "Siloxanes, Silanes and Silazanes in the Preparation of Ceramics and Glasses" by Wills et al, and "Special Heat-Resisting Materials from Organometallic Polymers" by Yajima, in Ceramic Bulletin, Vol 62, No. 8, pages 893-915 (1983), and the references cited therein. Typically, the organosilicon preceramic polymers are pyrolyzed in an inert gas to form silicon carbide, silicon nitride-containing articles, especially fibers.

Another process for producing ceramic articles, including fibers, is disclosed in U.S. Pat. No. 3,399,979 and U.S. Pat. No. 3,403,008. According to these patents, a preformed organic polymeric material is impregnated with a solution of a metal compound, heated to leave a carbonaceous relic containing the metal in finally dispersed form and further heating at 1,000°-2,000° C. in a non-oxidizing atmosphere to form the metal carbide or metal nitride depending on the atmosphere utilized. A similar approach has been taken in the formation of metal oxide fibers. Thus, as disclosed in U.S. Pat. Nos. 3,846,527 and 4,010,233 metal salts are incorporated into polymeric spinning solutions, the solutions spun into fibers, and the fibers calcined in air to yield metal oxide fibers. Use of alternative calcination atmospheres leads to the formation of metal carbide or nitride fibers. Useful of metal salt mixtures are disclosed as resulting in bimetallic oxide fibers.

Still another approach has been to disperse ceramic powders in a carrier component such as organic liquids including low molecular weight polymers, spinning the dispersion into fibers and then sintering the ceramics. An example of this procedure for forming ceramic fibers such as ferrimagnetic spinel fibers is disclosed in U.S. Pat. No. 4,559,191.

U.S. Pat. No. 4,126,652 discloses a process for preparing metal carbide-containing molded products which comprises heating a molded composition comprising at least one powdery metal selected from the group consisting of B, Ti, Si, Zr, Hf, V, Nb, Ta, Mo, W, Cr, Fe, and U and having an average particle size of not more than 50 microns and an acrylonitrile polymer at a temperature of about 200°-400° C., and then calcining the resulting product at a temperature of about 900°-2,500° C. in an inert atmosphere to form the metal carbide. Metal carbide fibers can be formed by the process which involves spinning the mixture of metal and carbon-forming polymer into fiber, heating to render the fibers infusible and then pyrolyzing to yield the metal carbide. The metals may be added together with any conventional calcining acid including metal oxides. One example in the patent describes adding metallic tungsten and metallic silicon to a polyacrylonitrile solution and ultimately forming fiber consisting of tungsten carbide and silicon carbide.

The present invention is based in part, in an attempt to improve the process of this latter mentioned patent and to provide improved ceramic articles, including fibers. It is known that certain diverse ceramics when combined as an alloy or solid solution possess superior properties than either of the ceramic materials alone or mere mixtures thereof. For example, it has recently been found that an alloy of SiC and AlN in comparison with SiC possesses superior creep resistance, improved fracture toughness, lower thermal conductivity, and possibly enhanced oxidation and corrosion resistance. It is believed that AlN-SiC solid solutions or alloys will be an important class of structural ceramics. A method of forming AlN-SiC solid solutions other than by hot pressing the inorganic powder has been reported by Rafaniello et al wherein using $AlCl_3.6H_2O$, starch and $SiO_2$ fine powder as starting materials, and heating, a sintered powder comprising a SiC-AlN solid solution having improved properties relative to SiC was prepared (Journal of Materials Science 16 (1981) 3479-3488). An improved process for forming silicon carbide and aluminum nitride solid solutions is set forth in copending, commonly assigned application U.S. Ser. No. 872,312, filed June 9, 1986 wherein an organoaluminum preceramic polymer containing a backbone comprised of alternating aluminum- and nitrogen-containing groups is mixed with an organosilicon preceramic polymer and pyrolyzed in an inert atmosphere.

Although the aforementioned U.S. Pat. No. 4,126,652 discloses numerous metals which can be added to a carbon-forming polymer to form metal carbides, and in at least one example illustrates the addition of two diverse metals to form a fiber comprising a mixture of the corresponding metal carbides, there is no specific mention or desirability of forming ceramic alloys or solid solutions by the method disclosed in the patent.

Another shortcoming associated with the process for forming metal carbides as disclosed in U.S. Pat. No. 4,126,652, is that many of the useful metal powders are refractory materials and are, thus, relatively inactive. Such refractory materials for example, are difficult to react with carbon to form metal carbides. Accordingly, carbonizing temperatures well above 1,000° C. are needed to react the refractory metals with the carbonaceous polymer to form the metal carbide. The need for such high temperatures increases the difficulty and ultimate cost of performing the process.

It is one object of the present invention to provide a novel method for forming ceramic alloys or solid solutions.

Another important object of the present invention is to provide an improved method for forming metal carbides from dispersions of fine metallic particles in carbonaceous polymers by improving the reactivity of the metals, in particular, the refractory metals with the carbonaceous polymer.

These and other objects, aspects and advantages, as well as the scope, nature and utility of the present invention, will be apparent from the following description and appended claims.

SUMMARY OF THE INVENTION

In accordance with the process of the present invention, ceramic alloys or solid solutions are formed by dispersing at least one powdery metal alloy or a powdery metal composition comprising the intimate mixture of two or more metals capable of forming a metal alloy with each other, in a precarbonaceous polymer, molding the composition, heating to cure or harden the molded composition, and subsequently heating the cured molded product at an elevated temperature sufficient to either carbonize the polymer and cause the reaction of the powdery metal alloy with carbon or to burn off the polymer and cause reaction between the metal alloy and the gas used to treat the molded composition to convert the cured molded product into a molded ceramic alloy. A most useful molded product formed by the process of the present invention is ceramic alloy fiber. Such fibers can be produced by spinning the dispersion of powdery metal alloy composition and precarbonaceous polymer into fibers, curing the fibers and then pyrolyzing at elevated temperatures.

In another aspect of the present invention, the process for preparing metal carbidde-containing molded products from mixtures of powdery metals and precarbonaceous polymers as disclosed in U.S. Pat. No. 4,126,652, is improved by increasing the reactivity of refractory powdery metal. In this aspect of the present invention, the powdery refractory metal is intimately associated with a second metal which when alloyed with the refractory metal yields an alloy having a lower melting temperature than the refractory metal, including eutectic alloys. The improved reactivity of the refractory metal allows the use of lower pyrolyzation temperatures to form the refractory metal compounds.

In still another aspect of the invention, the variety of ceramic alloys or solid solutions which can be produced by the process as described above can be increased by varying the pyrolysis atmosphere and consequent control of the stoichiometry of the ceramic alloy or solid solution. Thus, oxidizing atmospheres such as air or nonoxidizing atmospheres of inert gases, ammonia, phosphine, etc. can result in ceramics composed of metal oxides, metal carbides, metal nitrides, metal phosphides, respectively, and consequent alloying between the various ceramic species formed.

DETAILED DESCRIPTION OF THE INVENTION

The powdery metals to be used in the process of this invention can be selected from any two or more metals of the periodic table which can be formed into a metal alloy. As is known, to form an alloy from two metals, the atomic size and crystal structure of the individual metals must be similar. Thus, the elements of the first two periods of groups IIIA and IVA and the elements of groups IVB, VB, VIB, VIIB and VIII frequently result in the formation of metal alloys. Among the metal elements which are preferred include aluminum, silicon and boron as these elements can be converted to ceramic materials which appear to be the most useful and widely used structural ceramics. By utilizing the proper pyrolysis atmosphere, aluminum, silicon and boron carbides, nitrides or phosphides can be formed. Importantly, the present invention provides a process for producing ceramic alloys or solid solutions from the distinct metal carbides, nitrides or phosphides which are formed. In this invention, it is the close association of the respective metals on an atomic scale in the starting materials which allows the beneficial formation of cermic alloys. As stated previously, solid solutions of ceramics are believed to have enormous potential in improving the properties of individual ceramic compounds. Thus, powdery metallic alloys of aluminum, silicon or boron can yield solid solutions of, for example, $AlN-SiC$, $SiC-B_4C$, $AlN-Si_3N_4$, $AlN-B_4C$, etc.

The powdery metal can be added to the precarbonaceous polymer in one of several forms. Thus, powdery metal alloys, intimate mixtures of two alloying metals or intimate mixtures or solid solutions of one metal and one metallic compound which can form a solid solution with the metal can be utilized as the powdery metallic component.

The particular methods employed in producing the powdery metals for use in this invention are well known and any of such methods can be used. Thus, known alloying techniques can be used to form metal alloy powders. For example, co-melting or ball milling one soft metal with a hard metal can be used. Intimate mixtures of alloying metals or metallic compounds can be formed by ball milling the diverse metals or metallic compounds or spray drying a mixture of powdery metal and an alloying metal in liquid form. The term intimate mixture refers to the combination of diverse metals or metallic compounds in a unitary powdery form and is not intended to include mere mixtures of the separate elements or compounds within the precarbonaceous polymer.

Particularly useful powdery metal alloys or intimate mixtures contain at least one refractory metal and an alloying metal to form an alloy or lower melting point than the refractory metal. Such alloys activate the refractory metal rendering the refractory metal more reactive to form the ceramic. Thus, increases in the number of refractory metals able to be utilized and reduced pyrolyzation temperatures, broaden the usefulness of the present invention. As an example, among the preferred aluminum, silicon and boron elements, particular useful binary alloys contain aluminum with either silicon or boron carbide. Aluminum forms a eutectic with silicon (12% Si/88% Al, M.P. 577° C.) and as well dissolved boron carbide. By this method, the hard to react silicon and boron are activated and react more readily during pyrolysis.

The powdery metal or metallic compound to be used in the invention is desired to have a purity of not less than about 50% by weight and preferably, substantially higher. The powders may contain carbon and/or various metal oxides as the impurities, although oxide impurities are to be minimized to prevent consumption of the precarbonaceous polymer via carbothermic reduction. The size of the powders is critical and is typically not to be greater than 50 microns, preferably not more than about 10 microns. Even particles as low as 1 micron and submicron size are desirable since the smaller sized particles are easier to spin and are typically more reactive. If too large, the powdery metal will not react fast enough to maintain the integrity of the formed fibers while the polymer is carbonizing.

The precarbonaceous polymers to be used in the present invention are those polymeric materials whether natural pitches or the like or synthetic polymers which can be molded, preferably spun into fibers, and can be carbonized to yield a carbon article or burned off completely. A particularly preferred polymer is polyacrylonitrile and copolymers thereof which are used in the formation of carbon fibers. As the acrylonitrile polymer to be used in the invention, those disclosed in the aforementioned U.S. Pat. No. 4,126,652 are useful. Thus, polymers containing not less than about 80% by weight of units of acrylonitrile are favorable. When the acrylonitrile polymer is a copolymer, the other monomeric units may be derived from any monomer copolymerizable with acrylonitrile of which preferred examples are acrylic acid and esters thereof such as methyl acrylate, ethyl acrylate, 2-chloroethyl acrylate, 2-hydroxy-3-chloropropyl acrylate, 2,3-dibromopropyl acrylate, tribromophenyl acrylate, 2-hydroxyethyl acrylate, 2-methoxyethyl acrylate, methoxypolyoxyethylene acrylate and N,N-dimethylaminoethyl acrylate, methacrylic acid and esters thereof corresponding to the above mentioned acrylic acid esters, derivatives of acrylic acid esters such as methyl 2-hydroxymethylacrylate and methyl 2-hydroxymethylmethacrylate, itaconic acid and ester derivatives thereof, allylamine and derivatives, diallylamine and derivatives, phosphorus-containing monomers such as dimethyl 2-cyano-1-methylallylphosphonate, dimethyl 2-cyano-allylphosphonate and dimethyl 2-ethoxycarbonyl allylphosphonate, styrene and derivatives such as sodium p-styrenesulfonate, chloromethylstyrene and 1-methylstyrene, vinyl acetate, acrylamide, dimethylacrylamide, diacetacrylamide, methyl vinyl ketone, methyl isopropenyl ketone, methacrylonitrile, vinylidene cyanide, 1-cyanovinyl acetate, 2-hydroxymethylacrylonitrile, 2-acetylaminomethylacrylonitrile, 2-methoxymethylacrylonitrile, 2-(1-hydroxyethyl)acrylonitrile, 2-ethoxymethylacrylonitrile vinylidene chloride, vinyl bromide, sodium allylsulfonate, sodium methallylsulfonate, allyl alcohol, methyallyl alcohol, etc.

The molecular weight of the acrylonitrile polymer is usually in a range of about 30,000 to 300,000. More particularly, it may be preferably chosen in such a manner that the viscosity at the molding step becomes from about 50 to 10,000 poise, though the value is varied depending on the proportion of the powdery metal in the acrylonitrile polymer. In the case of molding in solution with a solid concentration of about 10% by weight, for example, the desirable molecular weight is from about 30,00 to 100,000 when the proportion of the powdery metal is 5 to 30% by weight, from about 50,000 to 150,000 when the proportion is 30 to 70% by weight, and from about 100,000 to 300,000 when the proportion is from about 70 to 90% by weight.

Other suitable precarbonaceous polymers include polyisobutylene, polyisoprene, polystyrene, polymethyl methacrylate, polyvinyl alcohol, polyacrylamide, polyacrylic acid, polyethylene oxide, cellulose, carboxymethyl cellulose, hydrolyzed starch, dextran, guar gum, polyvinylpyrrolidone, polyurethane, polyvinyl acetate, and the like, and mixtures thereof.

To increase the content of the ceramic material, e.g., metal oxide metal carbide, metal nitride, etc., in the final product, the proportion of the powdery metal in the fiber-forming mixture containing polymer and powdery metal alloy should be about 5 to 95% by weight, preferably about 10 to 80% by weight. Most preferably, the powdery metal will be present in amounts of at least 40% by weight.

The ceramic alloy which is ultimately formed will depend upon the chemical content of the pyrolyzing gas. For example, if it is desired to have a ceramic alloy comprising carbides, the pyrolyzing atmosphere will be composed of noble gases such as argon. On the other hand, if oxides are desired, molecular oxygen such as air can be included in the pyrolyzing atmosphere. A wide variety of ceramics can be formed by this invention by means of selecting the pyrolyzation atmosphere. Thus, by employing nitrogen or ammonia as the pyrolyzing atmosphere, one or more metals in the powdery metal alloy may become a metal nitride. Likewise, a pyrolyzing atmosphere containing phosphine will form a metal phosphide. The invention is not limited of course to these mentioned gases. Thus, any metalloid-containing gas can be used such as metal hydrides including germane, arsine, stibine, silane, diborane, etc.

If the precarbonaceous polymer is to be used as a carbon source and not merely burned away such that the final product comprises a metal alloy of metal carbides, the proportion of powdery metal alloy and the precarbonaceous polymer must be provided in amounts to yield the proper stoichiometry of the carbides formed. Thus, the proportion of powdery metal alloy and precarbonaceous polymer will be varied with the kinds of metal used and the yield of carbonization during pyrolyzation as well as the atmospheres used during pyrolyzation. The proportions of the various metals relative to each other contained in the metal alloy will also have to be chosen to form the desirable metal alloys as well as the desirable ceramic alloys or solid solutions in the final product.

The preparation of the molded composition may be carried out, for instance, by any one of the following procedures: a procedure which comprises subjecting a monomer mixture to solution polymerization with addition of the powdery metal alloy prior to, in the course of or after the polymerization so as to disperse it into the polymerization mixture, or alternatively dispersing the powdery metal alloy into a solution of the precarbonaceous polymer in a suitable solvent, and then subjecting the thus obtained powdery metal alloy-containing mixture to molding by a conventional dry or wet method; a procedure which comprises admixing the powdery precarbonaceous polymer with the powdery metal alloy while adding an appropriate amount of water thereto and subjecting the mixture to melt extrusion, etc. The moldable mixture can be formed into any useful shape including sheets, films, fibers, molded articles, etc.

The invention is particularly useful in the formation of ceramic alloy fibers from a spinning composition of precarbonaceous polymer having dispersed therein the metal alloy powder.

In most cases a solvent diluent is employed to provide the spinning composition (i.e., a spinning dope) with a room temperature viscosity range between about 0.1–3,000 poises, and preferably between about 100–1,000 poises.

The solvent employed with a water-miscible polymer can be water and/or a water-miscible solvent such as methanol, ethanol, acetic acid, dimethylformamide, tetrahydrofuran, and the like.

The solvent employed with an oil-soluble polymer can be an organic solvent such as benzene, hexane, dichloroethylene, dimethylacetamide, dibutyl ether, ethyl acetate, and the like.

Spinning can be accomplished with either the wet or dry spinning techniques. In dry spinning, the spinning composition issues from the spinning apparatus through a spinning column wherein a stream of drying gas is simultaneously fed through the spinning column. The temperatures of the spinning column and that of the dying gas is dependent on the volatiles which have to be evaporated from the filament during its passage through the spinning column.

In wet spinning, the spinning dope is extruded into a spin bath where coagulation of the spinning solution and the formation of the fiber occurs. A variety of suitable solvent-nonsolvent systems are known in the fiber art for use as the coagulating medium or spin bath. Suitable spin baths are nonsolvents for the organic polymer contained in the spinning composition and do not chemically react with the spinning solution. Also, the spinning bath should not attack the metal alloy. Thus, certain coagulating baths such as those comprising aqueous mineral acid solutions may attack certain reactive metals such as aluminum and should be avoided when such reactive metals are present. The fiber can be washed to remove any adhering traces of the spin bath, and then dried.

After a newly formed fiber is spun, usually it is stretched or drawn to about 100–300 percent of its original length by conventional techniques.

The preceramic polymeric fiber can be converted to any one of a variety of fibrous configurations prior to undergoing thermal treatment. For example, the fiber can be in the form of filaments, staple fibers, tows, plied yarns, knits, braids, fabrics, or other fibrous assemblages while undergoing thermal treatment. Alternatively various fibrous configurations may be formed from the inorganic fibers at the conclusion of the pyrolysis step fo the process.

To provide a final ceramic alloy fiber product with optimal physical properties, it is preferred to subject the preceramic polymeric fiber from the preceramic fiber formation step to an initial thermal treatment in a molecular oxygen environment. The organic polymer substrate in the preceramic fiber is partially carbonized to a stabilized form so that the subsequent pyrolysis step of the process can be effected without the concomitant destruction of the fibrous configuration. The thermal treatment step can be conducted by heating the fiber in a molecular oxygen-containing atmosphere at a temperature ranging between about 200°–600° C. The thermal treatment temperature selected is dependent upon the polymer resistance to distortion at elevated temperatures, and should not exceed the polymer melting point during at least the initial phase of the thermal treatment.

Volatile components that evolve during the thermal treatment step include water vapor and oxygen, and carbon monoxide and carbon dioxide resulting from a partial combustion of the polymer. Typically a 15–50% reduction in the weight of the fiber occurs during the thermal treatment step. It is believed that a crosslinking of carbon atoms occurs during the thermal treatment to produce a charred structure which is capable of serving as a carrier for the inorganic content of the fiber.

The thermal treatment can be performed in an autoclave by heating to the required temperature/time schedule. A continuous thermal treatment can be accomplished by the continuous passage of a fiber through a heated chamber or calcining furnace. The fibrous structure of the fiber is retained throughout the thermal treatment step. There is a tendency for the fiber to shrink while undergoing thermal treatment.

Alternatively, the preceramic fibers can be subjected to a chemical stabilization treatment before being subjected to the pyrolysis step. In a typical stabilization procedure, the dried fibers are contacted with a reactive free radical-forming agent such as diazidoformamide, which effects the desired crosslinked structure in the fiber structure at ambient temperatures (e.g., 10°–40° C.).

In the subsequent pyrolysis step of the process, the preceramic fiber (either charred or uncharred) is subjected to a temperature between about 700°–2,500° C. (preferably about 1,100°–1,800° C.). The pyrolysis period normally will range between about 0.2–8 hours. As stated above, any pyrolysis gas can be utilized to pyrolyze the fibers. Thus, inert gases will lead to the formation of metal carbides while reactive nitrogen-, phosphorus-, and metalloid-containing gases will lead to other ceramic materials being formed. Thus, if a carbide is desired, the pyrolyzation gas will be inert and the precarbonaceous polymer will be one that does not easily burn away so as to form a carbon structure which can be used for reaction. On the other hand, if the ceramic alloy is to be formed from reaction of the metal alloy powder and the pyrolyzing atmosphere, it may be desirable to use as the precarbonaceous polymer a polymer which burns off relatively easy.

According to the present invention, ceramic alloy-containing molded products can be obtained since the added metal components are provided as metal alloys or as intimate mixtures of alloying metals or metal compounds. Ceramic alloys are believed to have improved properties over unitary ceramic materials which have been formed by the prior art process as disclosed in U.S. Pat. No. 4,126,652 wherein sole metal elements or disassociated mixtures of metal elements have been used as the starting metal.

EXAMPLE 1

Dimethylformamide (70 parts), a metallic alloy of 12 wt% Si/88 wt.% Al, having a particle size of 5 microns, (15 parts) and polyacrylonitrile (molecular weight about 100,000) (15 parts) are mixed together under stirring at 50° C. for several hours to obtain a dispersion having a viscosity of about 300 poise. This viscous liquid is spun into a hot air-spinning tube at 200° C. to 250° C., and the solidified yarns are reeled off at a speed of 50 m/min, stretched about 3 times at 125° C. under pressure of steam and dried to obtain a metallic alloy-containing polyacrylonitrile fiber.

The thus obtained fiber is treated with hot air of 200° to 250° C. for about 1 hour, and after gradually elevating the temperature in an atmosphere of ammonia, treating the fibers at a temperature of 850° C. for 5 hours to yield a fiber substantially consisting of a solid solution of AlN and SiC.

EXAMPLE 2

Boron carbide powder and aluminum powder are ball milled with zirconia media for eight hours at a temperature of 200° C. The milled powders containing a mixture of $B_4C$ and Al are heated further for 6 hours at a temperature of 400° C. The procedure of Example 1 is followed to form the metallic-containing polyacrylonitrile fiber. The fibers, after curing in air at 250° C. for 1 hour are gradually heated up to a temperature of 1,100° C. in ammonia and kept at 1,100° C. for 6 hours. A fiber consisting essentially of a solid solution of $B_4C$ and AlN results.

What is claimed is:

1. A process for preparing molded products of ceramic alloys which comprised molding a preceramic composition comprising (a) from about 5 to 95% by weight based on the composition of at least one powdery metal alloy or a unitary powdery intimate mixture of alloying metals or alloying metallic compounds, said powdery metal alloy or intimate mixture comprising at least one refractory metal or metal compound selected from silicon, boron and compounds of silicon or boron and a second alloying metal comprising aluminum which lowers the melting point of said alloy below the melting point of said refractory metal or metal compound and, wherein the average particle size of said powdery metal alloy or unitary powdery intimate mixture is not greater than about 50 microns, and (b) a precarbonaceous polymer, curing said molded preceramic composition to harden some and, heating said cured molded preceramic composition at a temperature and in a pyrolyzation atmosphere sufficient to carbonize said polymer and cause reaction between said powdery metal alloy or intimate mixture and carbon.

2. The process of claim 1 wherein said powdery metal alloy or intimate mixture is present in an amount of at least about 40% up to about 95% by weight based on the total weight of said preceramic composition.

3. The process of claim 1 wherein said powdery metal alloy or intimate mixture has an average particle size of not greater than about 10 microns.

4. The process of claim 1 wherein said powdery metal alloy or intimate mixture has an average particle size of not greater than about 1 micron.

5. The process of claim 1 wherein said molding comprises spinning said preceramic composition into fiber.

6. The process of claim 1 wherein said polymer is carbonized in a non-oxygen-containing atmosphere.

7. The process of claim 6 wherein said non-oxygen-containing atmosphere is capable of reacting with at least one of said metals.

8. The process of claim 7 wherein said non-oxygen-containing atmosphere is selected from the group consisting of nitrogen, ammonia, phosphine and metal hydrides.

9. The process of claim 7 wherein said non-oxygen-containing atmosphere is capable of reacting with at least one of said metals to form a metal nitride.

10. The process of claim 9 wherein said atmosphere is ammonia.

11. The process of claim 8 wherein said non-oxygen-containing atmosphere is phosphine.

12. The process of claim 8 wherein non-oxygen-containing atmosphere is a metal hydride.

13. The process of claim 1 wherein said metal alloy is a eutectic alloy of about 12% silicon and 88% aluminum by weight.

14. The process of claim 1 wherein said metal alloy or intimate mixtures comprises an alloy or mixture of aluminum with boron carbide.

15. The process of claim 1 wherein the melting point of said alloy is below about 100° C.

16. A process for preparing ceramic alloy fibers which comprises spinning into fiber a preceramic composition comprising (a) from about 5 to 95% by weight based on the composition of at least one powdery metal alloy or unitary powdery intimate mixture of alloying metals or alloying metallic compounds, said powdery metal alloy or intimate mixture comprising at least one refractory metal or metal compound selected from silicon, boron and compounds of silicon or boron and a second alloying metal comprising aluminum which lowers the melting point of said alloy below the melting point of said refractory metal or metal compound and wherein the average particle size of said powdery metal alloy or unitary powdery intimate mixture is not greater than about 50 microns, and (b) an acrylonitrile polymer, curing said preceramic fiber to harden same and, heating said cured fiber in a non-oxygen-containing atmosphere and at a temperature sufficient to carbonize said polymer and cause reaction between said powdery metal alloy or intimate mixture and carbon.

17. The process of claim 16 wherein said non-oxygen-containing atmosphere is a gas capable of reacting with one of said metals to form a metal nitride.

18. The process of claim 16 wherein said non-oxygen-containing atmosphere is capable of reacting with at least one of said metals.

19. The process of claim 16 wherein said non-oxygen-containing atmosphere is selected from the group consisting of nitrogen, ammonia, phosphine and metal hydrides.

20. The process of claim 16 wherein said atmosphere is ammonia.

21. The process of claim 16 wherein non-oxygen-containing atmosphere is phosphine.

22. The process of claim 16 wherein said non-oxygen-containing atmosphere is a metal hydride.

* * * * *